United States Patent [19]

von Pragenau

[11] Patent Number: 4,545,586
[45] Date of Patent: Oct. 8, 1985

[54] DAMPING SEAL FOR TURBOMACHINERY

[75] Inventor: George L. von Pragenau, Huntsville, Ala.

[73] Assignee: The United States of America as represented by the Administrator of the National Aeronautics and Space Administration, Washington, D.C.

[21] Appl. No.: 692,875

[22] Filed: Jan. 18, 1985

Related U.S. Application Data

[63] Continuation of Ser. No. 489,902, Apr. 28, 1983.

[51] Int. Cl.⁴ .................. F16S 15/44; F01D 11/08
[52] U.S. Cl. .................................. 277/53; 415/174
[58] Field of Search .................... 277/87, 53, 54; 415/415

[56] References Cited

U.S. PATENT DOCUMENTS

| 2,327,867 | 6/1943 | Meyer | 277/87 |
| 2,998,991 | 9/1961 | Spencer | 415/174 |
| 3,137,602 | 6/1964 | Lincoln | 415/174 |
| 3,867,001 | 2/1975 | Moskowitz | 415/174 |
| 4,060,250 | 11/1977 | Davis et al. | 277/53 |
| 4,162,077 | 4/1979 | Crow et al. | 277/53 |
| 4,384,725 | 5/1983 | Nenov | 277/53 |
| 4,429,883 | 2/1984 | Nakanishi | 415/174 |

Primary Examiner—Robert I. Smith
Attorney, Agent, or Firm—Joseph H. Beumer; John R. Manning; Leon D. Wofford, Jr.

[57] ABSTRACT

A damping seal between a high speed rotor member (30) and stator member (33) that separates pressurized fluid compartments which is characterized by the rotor member having a smooth outer surface and the stator member having its bore surface roughened by a plurality of pockets or depressions.

6 Claims, 3 Drawing Figures

DAMPING SEAL FOR TURBOMACHINERY

This application is a continuation, of application Ser. No. 489,902, filed 4-28-83.

ORIGIN OF THE INVENTION

The invention described herein was made by an employee of the United States and may be manufactured and used by or for the Government of the United States for governmental purposes without the payment of any royalties thereon or therefor.

TECHNICAL FIELD

This invention relates to a seal for the gap that exists between fixed and rotating portions that separate pressurized fluid compartments which, because of its unique characteristics is identified as a damping seal. The seal because it both damps rotor motion and significantly reduces fluid leakage across the gap is a suitable replacement for labyrinth seals and squeeze film dampers.

BACKGROUND ART

Squeeze film dampers are commonly used to avoid high vibrations and instability encountered in high performance rocket engines and aviation turbomachinery. Squeeze film dampers are annular supports of major bearings and respond to the lateral bearing loads such that rotor motion is damped, especially at rotor resonances (i.e. critical speeds). In a typical squeeze film damper a viscous fluid, e.g. oil, is trapped in an annular groove which houses a bearing support ring. The fluid is sealed with o-rings between the groove walls and the bearing support ring. The support ring assumes different eccentric positions relative to the groove by following the lateral motions of the rotor bearing. The damping fluid is thus rushed and squeezed circumferentially inside the annular groove which causes a damping effect. A supply source replenishes the damping fluid to keep the groove filled when leaks occur through the o-rings on the groove walls. The groove contains occasionally a circumferential wave spring to better center the bearing and to provide more stiffness in supporting the bearings. Too much stiffness, however, diminishes the damping effect and too little stiffness permits excessive rotor motion and rubbing.

Accordingly, what is proposed is a damping seal that restricts leakage like a labyrinth seal and, also, extends the stable rotor speed range to more than twice the first critical speed.

DISCLOSURE OF THE INVENTION

In accordance with this invention, a damping seal is provided with a stator part having a roughness for stabilization and sealing and a rotor part which is smooth. The stator part forms a narrow seal gap with the smooth rotor surface. The stator part has its inner bore surface roughened with pockets of regular or random patterns. The roughness produces a high flow resistance that keeps the leakage lower than in labyrinth seals but also hinders circumferential flow (Couette flow).

BEST MODE FOR CARRYING OUT THE INVENTION

Figure 1:
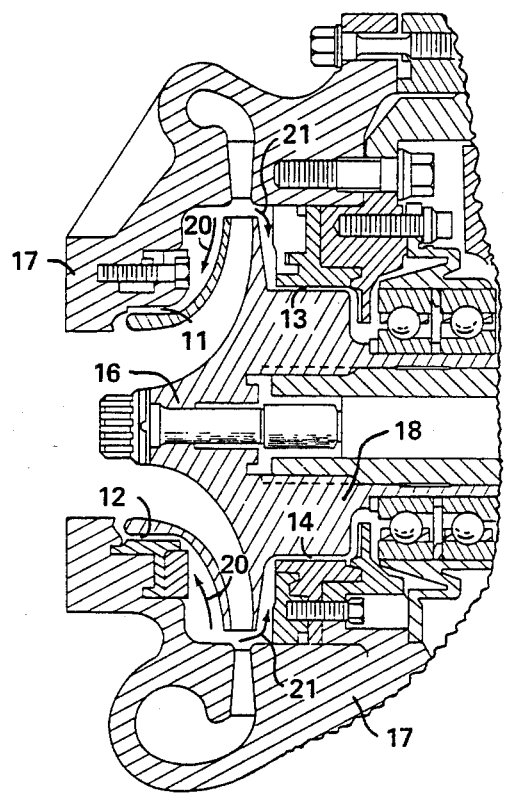
FIG. 1 is a partial cross-section of a high pressure pump utilizing the damping seals according to the present invention.

Referring to FIG. 1 wherein is shown a partial cross-sectional view of a high pressure pump for the space shuttle main engine wherein damping seals 11, 12, 13, 14 according to the present invention are utilized between the inlet of the impeller 16 and surrounding housing 17, and the discharge portion 18 of the impeller 16 and the surrounding housing 17. As shown, the cyrogenic fluid being pumped flows in the direction of the arrows 20, 21 from the high pressure side of the impeller 16 to the lesser pressure side through the damping seals 11, 12, 13, 14. The impeller 16 seal surface is smooth and the housing 17 seal surface is roughened. The impeller 16 has a speed of rotation from 30,000 to 34,000 rpm.

Figure 2:
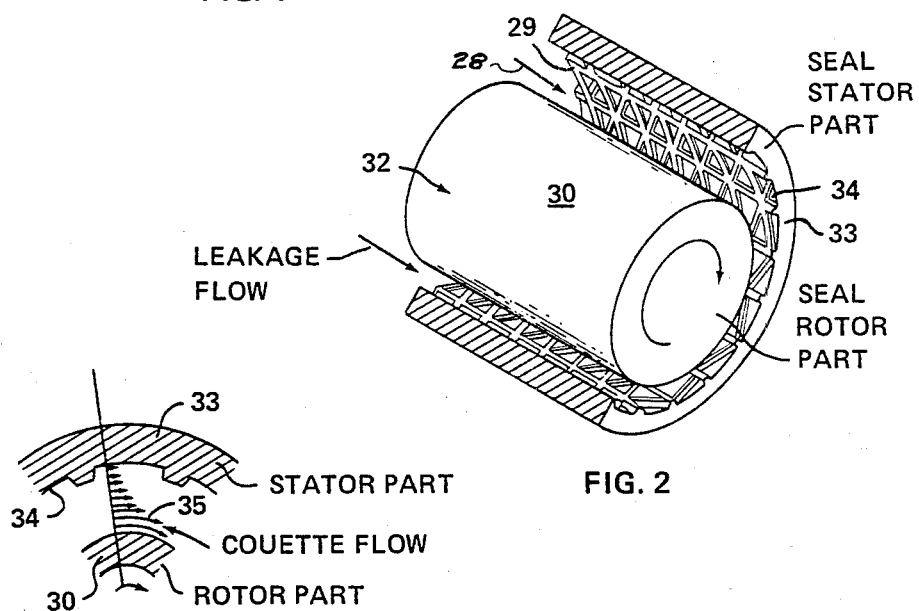
FIG. 2 is an idealized view of the invention showing the stator part and rotor part.

Referring to FIG. 2 wherein is shown in detail an idealized view of the damping seal which has a rotor part 30 which a smooth outer surface 32 which would correspond to the impeller 16 seal surface of FIG. 1 and a stator part 33 with an outer bore surface roughened with triangular pockets 34 which would correspond with the housing 17 seal surface of FIG. 1.

In this embodiment, triangular pockets 34 produce turbulence to reduce leakage 28 and circumferential flows 35. Two pocket walls 29 are angled 60 degrees to the rotor's longitudinal and rotational axis to enhance the fluid exchange in and out of the pockets 34. The base wall of the triangular pockets 34 extends longitudinally to the rotor's axis. The pocket's flow collides with the leakage crossing the mouth opening of the pocket 34 causing the fluid leakage 28 and circumferential flows 35 to slow down. The isogrid pattern shown for triangular pocket 34 generates the most flow resistance for least pocket volumn. The triangular pockets 34 have the highest ratio of perimeter versus area of all regular polygones and thus offers the highest flow resistance in all directions. Other regular and irregular patterns of cylindrical, honeycomb, diamonds, and other shaped pockets could be used but with less effect.

Damping seals require a pocket depth ($k_s$) versus rotor surface roughness ($k_r$) ratio that range from 10 to 10,000. It is the roughness ratio ($k_s/k_r$) that determines the friction ratio which in turn determines the ratio of rotor surface velocity (w) (angle velocity of rotor times the radius of the rotor) versus the fluid circumferential velocity (v). The objective is to reach a high ratio (w/v) because this ratio sets the rotational speed limit of the rotor. The first critical speed of the rotor times the ratio (w/v) is approximately the speed limit for a rotor stabilized by damping seals. The approximate relationship is $$w/v = 1 + f_s/f_r \qquad (1)$$

Where:
 w=Rotor surface velocity
 v=Fluid circumferential velocity
 $f_s$=Stator surface friction for fluid
 $f_r$=Rotor surface friction for fluid.

Moody's well published pipe friction equation with the seal gap as the hydraulic radius gives for turbulent flow the approximate relationship $$f_s/f_r = \sqrt[3]{k_s/k_r} \quad (2)$$

Where:
$k_s$=Pocket depth of stator, inch
$k_r$=Rotor surface roughness, inch.
A substitution of equation (2) into (1) gives the following:

$$w/v = 1 + \sqrt[3]{k_s/k_r} \quad (3)$$

which yields the seal's velocity ratio w/v which specifies the rotor rotational speed limit.

A more accurate rotor speed limit is obtained through the analysis given in NASA Technical Paper 1987, March 1982 (Published on June 8, 1982) in conjunction with complex rotor dynamic simulations taking into account other whirl drivers such as turbine tip clearance effects (Alford forces). The accurate speed limit is slightly less than the approximate speed limit mainly because other whirl drivers are included. For example, if the first critical speed is at 10,000 RPM then the approximate speed limit for stable operation is 50,000 RPM assuming a velocity ratio (w/v) of five.

What is desired is to apply damping seals generously to suppress whirl drivers and to maintain the high speed limit set by the damping seal's velocity ratio (w/v).

A typical design with a 2.9 inch seal diameter, 0.6 inch seal length, 0.006 inch seal gap, 0.000032 inch rotor roughness, and 2,000 psi pressure drop has 0.02 inch deep pockets with a 0.075 inch width to a side, and a wall thickness of 0.0025 inch. The velocity ratio (w/v) is 5. Sufficient wall thickness is required to avoid fatigue when rubbing occurs. The full pocket depth is the roughness value. The roughness value for the stator pockets reaches a limit less than the depth, however, for very deep pockets because the fluid near the bottom does not participate in the fluid exchange.

Figure 3:
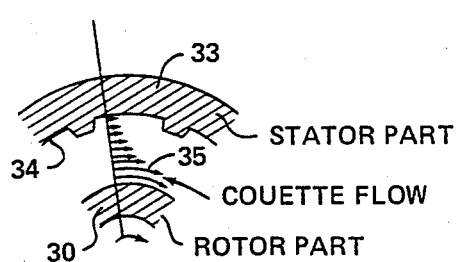
FIG. 3 is a partial cross-section of FIG. 2 showing the fluid Couette flow in the seal gap.

The stator part roughness 33 produces a high flow resistance that keeps the leakage lower than labyrinth seals and also hinders the circumferential flow. The circumferential flow is the Couette flow 35, as shown in FIG. 3, due to the shear forces generated by a rotor turning in a viscous and often turbulent fluid film. The Couette flow 35 will assume half the rotor speed for equally smooth stator and rotor surfaces. The high speed Couette flow of the smooth stator and rotor surfaces generates a driver for half speed whirls at the first significant rotor resonance. Contrarily, damping seals of the present invention exhibit Couette flows as low as one-sixth the rotor speed and whirls are avoided.

The small leakage flow of damping seals induces stiffness and damping effects when the gap between the rotor and stator changes at each circumferential position as the rotor moves laterally. The leakage resistance increases where the gap narrows and decreases where the gap opens. The fluid injected axially by the pressurized upstream compartment causes a high pressure in the narrow gap area that is diametrically opposite to the open gap area where lower pressure is induced. The integral result is a stiffness effect. The area where the gap becomes smaller rushes more fluid downstream than the diametrically opposite area where the gap becomes larger storing momentarily the fluid. The rushing and storing of fluid causes another pressure distribution proportional to lateral rotor velocity. Diametrically opposite high and low pressure forces are generated that add damping to the stiffness effect. The whirl driving force is caused by the circumferential Couette flow that twists the axial flow into a helix. Flow zones approaching a narrow gap area divert more flow downstream while the opposite is true for flow zones approaching an open gap area. Diametrically opposed high and low pressure areas are generated perpendicular to the zones of the stiffness effect adding a forward whirl driver. See NASA Technical Paper 1987, March 1982, written by the inventor, and which was published June 8, 1982. It is considered practical for the damping seal to achieve velocity ratios of ten to one.

Thus, has been disclosed a unique damping seal that may serve as a replacement for labyrinth seals or other rotating shaft seals that separate pressurized compartments. The damping seal takes over the dynamic function of a squeeze film damper and is mounted at several shaft seal locations. The seal consists of two parts; the stator with a rough bore surface and the rotor which has a smooth shaft running inside the stator.

As the damping seal of the present invention will fit in places of conventional shaft seals it is possible to reclaim turbomachines that are troubled by expensive shutdowns. No extra space is required for the damping seals because of their dual function a seals and dampers. Rotors can be stiffly supported by mounting the bearings directly to hard points and by adding multiple supports with each damping seal. High critical speeds are the result which together with high seal damping increases speed limit and bearing life. Rotor motion is also reduced which permits tighter clearances to achieve high efficiency in energy conversion. Turbomachinery thus designed will be light and compact. Rotational speed limits of approximately 3 to 6 times the first critical speed are feasible.

The embodiments described are considered illustrative of the invention and changes and variations may be made without departing from the scope of the claims.

I claim:

1. In a high speed turbomachinery, a journal bearing for increasing rotor speed significantly and damping rotor motion, comprising:

an elongated stator portion having a bore along its longitudinal axis;

an elongated rotor portion situated within said bore of said stator portion with a small gap therebetween;

a high pressure fluid volume on one side of said stator and rotor portions and a low pressure fluid volume on the other side of said stator and rotor portions so said small gap is filled with fluid leaking from said high pressure fluid side to low pressure fluid side and thereby acting as a journal support;

said rotor portion having a smooth rigid outer surface on the surface of said rotor portion facing the stator portion said smooth rigid outer surface of said rotor portion having a typical roughness of 0.000032 inch;

said stator portion having an outer surface provided with shallow patterned pockets facing said rotor portion for providing high roughness for all fluid flow directions so as to reduce leakage rate of fluid across said gap, and rotor whirl forces are reduced, said pockets having a pocket depth corresponding to 10 to 10,000 times the roughness depths of said smooth rigid outer surface of said rotor portion and having rigid side walls with a substantial thickness that prevent fatigue and break-up of the walls when rubbing contact with said rotor portion occurs.

2. In a high speed turbomachinery, the journal bearing according to claim 1, wherein:
said pattern surface on said stator portion is composed of a plurality of triangular shaped pockets being spaced to form a perimeter wall between adjacent pockets with substantial thickness.

3. In a high speed turbomachinery, the journal bearing according to claim 2, wherein;
said triangular shaped pockets have one side extending longitudinally to the rotational axis of said rotor portion and the other side angles 60 degrees to the rotational axis of said rotor portion.

4. In high speed turbomachinery, a journal bearing for damping rotor motion and providing stable high speed operation, comprising
an elongated stator portion having a bore along its longitudinal axis;
an elongated rotor portion situated within said bore of said stator portion with a small gap therebetween;
a high pressure fluid on one side of said stator and rotor portions and a low pressure fluid on the other side of said stator and rotor portions so said small gap is filled with fluid leaking from said high pressure fluid side to said low pressure fluid side and thereby acting as a journal support;
said rotor portion having a smooth rigid outer surface on the surface of said rotor portion facing the stator portion;
said stator portion having an outer surface provided with depressions facing said rotor portion so as to cause a reduced leakage rate of fluid across said gap, and rotor whirl forces are reduced, said depressions having side walls with a substantial thickness that prevent fatigue and break-up of the walls when rubbing contact with said rotor portion occurs; and
wherein said fluid within said gap has a fluid velocity in the range of ten to one as determined by the following parameter relationship:

$$w/v = 1 + \sqrt[3]{k_s/k_r}$$

Where:
w/v = Fluid velocity ratio
w = Rotor surface velocity
v = Fluid circumferential velocity
$k_s$ = Depth of surface depression on stator surface within the range of 10 to 10,000 times the value of $k_r$
$k_r$ = Rotor surface roughness value of approximately 0.000032 inch.

5. A sealing and damping means replacement for journal bearings in high speed turbomachinery, comprising:
an elongated stator portion having a bore along its longitudinal axis;
an elongated rotor portion situated within said bore of said stator portion with a small gap therebetween;
a high pressure fluid on one side of said stator and rotor portions and a low pressure fluid on the other side of said stator and rotor portions so said small gap is filled with fluid leaking from said high pressure fluid side to said low pressure fluid sides and thereby acts as a journal support;
said rotor portion having a smooth rigid outer surface on the surface of said rotor portion facing the stator portion;
said stator portion having a roughened surface provided with depressions on said stator portion facing said rotor portion so as to result in a reduced leakage rate of fluid across said gap and rotor whirl forces are reduced, said depressions having side walls with a substantial thickness to prevent fatigue and break-up of the walls when rubbing contact with said rotor portion occurs; and
wherein said fluid within said gap has a fluid velocity ratio of approximately ten to one as determined by the following parameters relationship:

$$w/v = 1 + \sqrt[3]{k_s/k_r}$$

Where:
w/v = Fluid velocity ratio
w = Rotor surface velocity v = Fluid circumferential velocity $k_s$ = Depth of surface depression on stator surface within the range of 10 to 10,000 times the value of $k_r$
$k_r$ = Rotor surface roughness value of approximately 0.000032 inch.

6. A high pressure turbomachinery rotor support and seal, comprising:
an annular support having an elongated rotor portion rotating within the bore of an elongated stator portion with a small open gap therebetween dividing a high pressure fluid volume one side of said portions from a low pressure fluid volume on the other side of said portions;
sealing and damping means for sealing said gap between said rotor portion and damping radial rotor motion and avoiding rotor whirl thereby increasing rotor speeds and bearing life;
said sealing and damping means being composed of a smooth rigid outer surface with a typical roughness of 0.000032 roughness on said rotor portion, and rigid patterned surface pockets on said stator portion providing high roughness for all fluid flow directions to reduce fluid leakage along said gap and to hinder circumferential flow;
said patterned surface having a depression depth in the range of 10 to 10,000 times the depression depth of said smooth rigid outer surface of the rotor portion, said pockets also having pocket walls with substantial thickness to prevent fatigue and break-up of the walls should rubbing contact with said rotor occurs.

* * * * *